United States Patent
Dorfmeister et al.

(10) Patent No.: US 12,006,885 B2
(45) Date of Patent: Jun. 11, 2024

(54) METHOD FOR OPERATING AN INTERNAL COMBUSTION ENGINE, IN PARTICULAR OF A MOTOR VEHICLE, AND INTERNAL COMBUSTION ENGINE

(71) Applicant: Bayerische Motoren Werke Aktiengesellschaft, Munich (DE)

(72) Inventors: Roland Dorfmeister, Dachau (DE); Marcel Kruppa, Munich (DE); Benjamin Steiner, Karlsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/033,966

(22) PCT Filed: Nov. 2, 2021

(86) PCT No.: PCT/EP2021/080344
§ 371 (c)(1),
(2) Date: Apr. 26, 2023

(87) PCT Pub. No.: WO2022/106188
PCT Pub. Date: May 27, 2022

(65) Prior Publication Data
US 2023/0417197 A1 Dec. 28, 2023

(30) Foreign Application Priority Data
Nov. 23, 2020 (DE) ...................... 10 2020 130 841.8

(51) Int. Cl.
*F02D 13/02* (2006.01)
*F02D 41/00* (2006.01)
*F02D 41/10* (2006.01)

(52) U.S. Cl.
CPC ..... *F02D 13/0269* (2013.01); *F02D 13/0226* (2013.01); *F02D 41/0007* (2013.01); *F02D 41/10* (2013.01); *F02D 2041/001* (2013.01)

(58) Field of Classification Search
CPC ............ F02D 13/0226; F02D 13/0234; F02D 13/0269; F02D 41/0007; F02D 2041/001; F02D 41/10; Y02T 10/12
See application file for complete search history.

(56) References Cited

U.S. PATENT DOCUMENTS

2007/0068156 A1  3/2007  Rottenkolber et al.
2015/0134230 A1  5/2015  Hoffmeyer et al.
(Continued)

FOREIGN PATENT DOCUMENTS

DE  10 2004 026 405 A1  12/2005
DE  10 2012 014 713 A1  1/2014
(Continued)

OTHER PUBLICATIONS

International Search Report (PCT/ISA/210) issued in PCT Application No. PCT/EP2021/080344 dated Feb. 14, 2022 with English translation (five (5) pages).
(Continued)

*Primary Examiner* — Loren C Edwards
(74) *Attorney, Agent, or Firm* — Crowell & Moring LLP

(57) ABSTRACT

An internal combustion engine may have an intake valve device. A sudden load variation may be carried out in which a torque provided by the internal combustion engine is increased from a first value to a second value which is higher than the first value. While the sudden load variation is being carried out, the intake valve device may be operated according to an operating method different from the second operating method and is thereby closed later than in the second operating method. After the sudden load variation has been carried out, and while the internal combustion engine provides the torque having the second value after the sudden load variation has been carried out, the internal combustion engine may be switched over from the first operating method different from the second operating method to the second operating method.

19 Claims, 2 Drawing Sheets

(56) References Cited

U.S. PATENT DOCUMENTS

| | | | |
|---|---|---|---|
| 2015/0219025 A1* | 8/2015 | Koch | F02D 13/023 |
| | | | 60/611 |
| 2017/0089271 A1 | 3/2017 | Kleinhans et al. | |
| 2020/0032719 A1* | 1/2020 | Thaler | F02D 41/0007 |

FOREIGN PATENT DOCUMENTS

| | | |
|---|---|---|
| DE | 10 2012 018 692 A1 | 3/2014 |
| DE | 10 2015 110 558 A1 | 1/2017 |
| DE | 10 2018 212 247 A1 | 1/2020 |

OTHER PUBLICATIONS

German-language Written Opinion (PCT/ISA/237) issued in PCT Application No. PCT/EP2021/080344 dated Feb. 14, 2022 (nine (9) pages).

German-language Search Report issued in German Application No. 10 2020 130 841.8 dated Jul. 21, 2021 with partial English translation (14 pages).

\* cited by examiner

METHOD FOR OPERATING AN INTERNAL COMBUSTION ENGINE, IN PARTICULAR OF A MOTOR VEHICLE, AND INTERNAL COMBUSTION ENGINE

BACKGROUND AND SUMMARY

The invention relates to a method for operating an internal combustion engine, in particular of a motor vehicle. Furthermore, the invention relates to an internal combustion engine.

DE 10 2012 014 713 A1 discloses a method for operating a combustion engine which comprises a compressor for setting a charge density in an intake manifold of the combustion engine and setting means for setting a volumetric efficiency. Furthermore, an internal combustion engine with a four stroke gasoline engine is to be gathered as known from DE 10 2015 110 558 A1.

It is an object of the present invention to provide a method for operating an internal combustion engine, in particular a motor vehicle, and to provide an internal combustion engine of this type, with the result that particularly advantageous operation of the internal combustion engine can be realized.

According to the invention, this object is achieved by way of a method with the features of the independent claims. Advantageous embodiments of the invention are the subject matter of the dependent patent claims.

A first aspect of the invention relates to a method for operating an internal combustion engine which is preferably configured as a reciprocating piston engine or reciprocating piston machine, in particular of a motor vehicle and very particularly of a motor car which is configured, for example, as a passenger car. This means that the internal combustion engine is preferably a constituent part of this motor vehicle which, in its completely produced state, can be driven or is driven with the internal combustion engine, in particular in combustion operation thereof. The internal combustion engine is preferably configured as a four stroke engine, with the result that a respective work cycle of the internal combustion engine preferably comprises precisely four strokes. The internal combustion engine has, for example, an output shaft which is configured, in particular, as a crankshaft and via which the internal combustion engine can provide a torque for driving the motor vehicle. Here, the respective work cycle comprises precisely two complete revolutions of the drive shaft and, as a consequence, 720 degrees of crank angle (° KW). Moreover, the internal combustion engine has at least one combustion chamber which is delimited or formed for example partially by way of a cylinder of the internal combustion engine and partially by way of a piston which is received in the cylinder such that it can be moved translationally. During the combustion operation of the internal combustion engine, combustion processes take place in the combustion chamber. Therefore, a fuel/air mixture which is also simply called a mixture is burned in the combustion chamber within the respective work cycle. As a result, for example, the piston and, via the piston, the output shaft are driven, in particular by virtue of the fact that the piston is connected via a connecting rod in an articulated manner to the output shaft. In the case of the method, the internal combustion engine is operated in its combustion operation.

The internal combustion engine has (in particular, precisely) one inlet valve device which is assigned to the combustion chamber and via which fresh air from an intake section (also called an inlet section) of the internal combustion engine can be introduced or, in particular within the respective work cycle, is introduced into the combustion chamber. The fresh air is simply also called air, the abovementioned mixture comprising the fresh air as air and a preferably liquid fuel which is introduced, in particular injected directly, into the combustion chamber within the respective work cycle. Furthermore, it is conceivable that the fuel is introduced into the combustion chamber with an intake manifold or duct injection device, by the fuel being introduced upstream of the combustion chamber into the intake section and, as a result, into the fresh air which flows through the intake section and being transported into the combustion chamber with the fresh air. The intake section (also called an inlet section) of the internal combustion engine can be flowed through by the fresh air or is flowed through by the fresh air, and conducts the fresh air to and into the combustion chamber. The inlet valve device comprises at least one inlet valve. In particular, the inlet valve device comprises at least or precisely two inlet valves. The respective inlet valve can be moved between a closed position and at least one open position, in particular relative to a cylinder head and/or in a translational manner. In order to introduce the fresh air via the inlet valve device into the combustion chamber, the valve device and therefore the respective inlet valve are opened and thereupon closed within the respective work cycle.

For example, in the case of the method, the internal combustion engine is operated with an electronic computing device (also called an engine controller or else an engine control unit), in particular in combustion operation. In the case of the method, a load step of the internal combustion engine is carried out. In particular, the load step is carried out or brought about with the electronic computing device. In the case of the load step, the torque which is provided by the internal combustion engine via its output shaft is increased from a first value to a second value which is higher than the first value. In other words, in the case of or by way of the load step, an increase in the torque takes place in such a way that the torque first of all has the first value and, by way of or after the load step, has the second value which is greater than the first value. The torque which has the first value is also called a first torque, the torque which has the second value also being called a second torque. Here, the second torque is higher than the first torque. The torque which is provided by the internal combustion engine via its output shaft is or characterizes a load of the internal combustion engine. In other words, the torque which is provided by the internal combustion engine via its output shaft is opposed by a load of the internal combustion engine, the load being increased, for example, by virtue of the fact that the torque is increased by way of or in the case of the load step. Therefore, the increase in the torque is also called a load increase or load step. The load step or carrying out of the load step results, in particular, from a driver request (also called a driver demand) of the driver of the motor vehicle. This is to be understood to mean, in particular, the following: for example, the driver actuates or operates an operating element which is arranged, in particular, in the interior compartment of the motor vehicle, as a result of which the driver requests an or the abovementioned increase in the torque and, as a consequence, an or the above-described load step. The operating element is, for example, an accelerator pedal which the driver can operate and can therefore actuate by way of his/her foot.

The operating element can be moved, for example, into different positions, by the operating element being operated and therefore actuated by the driver. The respective position corresponds with a respective value of the torque which is to be provided by the internal combustion engine via its output shaft. For example, the driver therefore requests the load step by virtue of the fact that the driver moves the operating element out of a first one of the positions into a second one of the positions which is different than the first position, the first position corresponding with the first value of the torque and the second position corresponding with the second value of the torque. The driver request, that is to say, increasing of the torque which is requested or desired by the driver or by the actuation of the operating element and, as a consequence, the desired or requested load step, is detected, for example, with at least one sensor element. The sensor element provides, for example, a signal which is, in particular, electric, characterizes the driver request, and is received by the electronic computing device. The electronic computing device operates, in particular closed-loop or open-loop controls, the internal combustion engine in a manner which is dependent on the received signal, in such a way that the load step is implemented and, as a consequence, the internal combustion engine carries out the load step which has been requested by the driver. For example, an acceleration of the motor vehicle can be brought about by way of increasing of the torque (also called an increase in the torque), that is to say by way of the load step.

In order then for particularly advantageous operation of the internal combustion engine to be able to be realized, in particular such that the internal combustion engine can firstly be operated with particularly low fuel consumption and secondly a particularly advantageous response behavior of the internal combustion engine can be realized, it is provided according to the invention that, while the load step is carried out, the inlet valve device is operated in accordance with an operating method which is different than the Miller method, and is closed later as a result in comparison with the Miller method, in particular within the respective work cycle. Furthermore, it is provided according to the invention that, after the load step is carried out, that is to say after termination of the load step and therefore when the torque has been increased from the first value to the second value, and while the internal combustion engine provides the torque which has the second value via its output shaft, the internal combustion engine is switched over from the operating method which is different than the Miller method to the Miller method, as a result of which, after the load step is carried out and while the internal combustion engine provides the torque which has the second value via its output shaft, the inlet valve device is operated in accordance with the Miller method and is closed earlier as a result in comparison with the operating method, in particular within the respective work cycle. This means that, after the load step is carried out and therefore after its end, that is to say during a time interval of the internal combustion engine which temporally directly follows the load step and therefore its end, a switchover is made from the operating methods which are different than the Miller method to the Miller method, with the result that, during the time interval, the inlet valve device is operated in accordance with the Miller method and is closed earlier than the operating method as a result, the internal combustion engine providing the torque which has the second value via its output shaft during the time interval, in particular continuously or without interruption. The abovementioned time interval is also called a first time interval. Here, the Miller method and the operating method which is different than the Miller method is to be understood to mean, in particular, the following: the Miller method differs from the operating method which is different than the Miller method at least or exclusively by virtue of the fact that, when the internal combustion engine and therefore the inlet valve device are operated in accordance with the Miller method, the inlet valve device is closed earlier within the respective work cycle than when the internal combustion engine and therefore the inlet valve device are operated in accordance with the operating method. Once again in other words, if the internal combustion engine and therefore the inlet valve device are operated in accordance with the Miller method, the inlet valve device is closed earlier within the respective work cycle in comparison with operation, during which the internal combustion engine and therefore the inlet valve device are operated in accordance with the operating method.

Furthermore, it can preferably be provided that the Miller method and the operating method differ from one another by way of a respective valve stroke, the inlet valve device or the inlet valve covering the valve stroke which is also called an inlet stroke or a stroke on its path from the closed position into the open position. It is preferably provided here that the inlet stroke of the Miller method or in the case of the Miller method is smaller than the inlet stroke of the operating method or in the case of the operating method. In other words, it is preferably provided that the Miller method is carried out with a valve stroke of the inlet valve device which is reduced in comparison with the operating method.

During the method, the output shaft rotates at a rotational speed, in particular relative to a housing element of the internal combustion engine, which housing element is configured, for example, as a crankcase. The rotational speed of the output shaft is also called the rotational speed of the internal combustion engine. During or within the respective work cycle, the output shaft which is configured, for example, as a crankshaft assumes a plurality of rotational positions which are different from one another and are also called degrees of crank angle or are defined by way of degrees of crank angle. If the internal combustion engine and therefore the inlet valve device are operated in accordance with the Miller method, the inlet valve device is closed within the respective work cycle at a first rotary position of the output shaft, that is to say at a first degree of crank angle. The fact that the inlet valve device is closed within the respective work cycle is to be understood to mean that the inlet valve device reaches or assumes its closed position within the respective work cycle. If the internal combustion engine and therefore the inlet valve device are operated in accordance with the operating method, the inlet valve device is closed within the respective work cycle at a second rotary position of the output shaft and, as a consequence, at a second degree of crank angle, the second rotary position or the second degree of crank angle occurring later than the first rotary position or than the first degree of crank angle within the respective work cycle and, as a consequence, lying after the first rotary position or after the first degree of crank angle. This means that, within the respective work cycle of the internal combustion engine, the inlet valve device is closed at a respective time (also called a closing time), that is to say assumes its closed position, the closing time coinciding within the respective work cycle with a rotary position of the output shaft which the abovementioned rotary position assumes at the closing time within the work cycle. That rotary position of the output shaft within the respective work cycle which coincides with the closing time and therefore that degree of crank angle of the output shaft which coincides with the closing time within the respective work cycle are also called Inlet Closes (ES). In the case of the Miller method, the Inlet Closes lies earlier than in the case of the operating method, with the result that the feature that the internal combustion engine is switched over from the operating method to the Miller method is to be understood to mean, in particular, that the Inlet Closes (ES) is advanced. If the internal combustion engine is switched over, for example, from the Miller method to the operating method, in particular by way of the electronic computing device, the Inlet Closes (ES) is retarded as a result.

Within the context of the invention of the present disclosure, when the Miller method is mentioned, the Miller method can be understood to mean precisely one Miller method, with the result that, when the Miller method is mentioned, the same Miller method is always meant, or the Miller method, that is to say the term "Miller method", can be understood to mean a multitude of methods or a group of methods with a plurality of Miller methods which, in particular, are different than one another but all at least differ from the operating method in that, in the case of the respective Miller method, the Inlet Closes lies or takes place earlier than in the case of the operating method which is different than the Miller method or methods. Here, the Miller method comprises, in particular, that the Inlet Closes (ES) lies ahead of the bottom dead center of the piston within the respective work cycle. In contrast, for example, the operating method which is different than the Miller method comprises that the Inlet Closes coincides with the bottom dead center of the piston or else preferably lies after the bottom dead center of the piston within the respective work cycle of the internal combustion engine.

In the case of or by way of the Miller method, the inlet valve device is operated, in particular actuated and therefore opened and closed, for example in accordance with what are known as Miller control times. In particular, it is provided within the respective work cycle that, in order to introduce the fresh air from the intake section into the combustion chamber, the initially closed inlet valve device is opened, in particular, at an opening time. This means that, at the opening time, opening of the initially closed inlet valve device begins, the opening of the inlet valve device ending at the closing time, that is to say at or in the case of Inlet Closes. A rotary position of the output shaft which coincides with the opening time or a degree of crank angle of the output shaft which coincides with the opening time within the respective work cycle is also called Inlet Opens (EÖ).

Within the respective work cycle, the initially closed inlet valve device is first of all opened and then closed again, with the result that the Inlet Opens lies ahead of the Inlet Closes within the respective work cycle. It is conceivable here that the Inlet Opens in the case of the Miller method corresponds to the Inlet Opens in the case of the operating method. In the case of the operating method, the inlet valve device is actuated, in particular opened and closed, within the respective work cycle in accordance with further control times which are different than the Miller control times. In comparison with the Miller control times, for example, the further control times are control times which are optimum in terms of filling and/or boost pressure. This is to be understood to mean, in particular, that the further control times are more favorable, that is to say more advantageous, for a filling of the combustion chamber in comparison with the Miller control times, in particular when the aim is that the internal combustion engine is intended to provide a high torque or a high load via its output shaft, in particular with at the same time as rapid build-up of torque as possible. In comparison with the operating method, however, the Miller method makes it possible, for example, that the internal combustion engine can be operated with a particularly low fuel consumption. Here, the invention is based, in particular, on the following findings and considerations: in the case of the use of the Miller method and therefore when the inlet valve device is actuated in accordance with the Miller control times, a higher pressure of the fresh air which prevails in the intake section and is also called an intake manifold pressure can be required in comparison with further control times, in order to get the identical mass of the fresh air into the combustion chamber and therefore into the cylinder. A consequence of this can be that, when the internal combustion engine and therefore the inlet valve device are also operated during a load step in accordance with the Miller method, a load step of this type which is carried out using Miller control times almost always has a temporal disadvantage in comparison with a load step which is carried out with the further control times or spreads which are optimum in terms of boost pressure and/or filling. The temporal disadvantage is to be understood to mean that the load step in the case of the use of the Miller method takes longer or is concluded at a later time in comparison with the use of the operating method. One reason for this can be that, for realization purposes, that is to say for beginning, carrying out and ending the load step, the intake manifold pressure first of all has to be increased greatly or more greatly, for example with a compressor, if the Miller method is used in comparison with the use of the operating method. Here, the further control times which are optimum in terms of boost pressure and/or filling are to be understood to mean, in particular, a stroke/spread combination, it being possible for a filling of the combustion chamber, which is such that it can be achieved by way of the Miller method only with the aid of a substantially higher intake manifold pressure, to already be realized at a low intake manifold pressure with the further control times. In particular, in the case of the further control times, the intake section or the compressor which is arranged in the intake section can provide a sufficiently high air mass particularly rapidly and, in particular, more rapidly than the Miller method. The invention can then utilize a variable, in particular fully variable, valve drive, in order to circumvent ostensible performance disadvantages of the Miller method which is also called the Miller combustion method in comparison with the operating method, without it being necessary, however, for the Miller method to be dispensed with in operating situations in the internal combustion engine which are different than load steps. Therefore, the switchover from the operating method to the Miller method and, for example, a switchover from the Miller method to the operating method can be realized by way of a variable, in particular fully variable, valve drive of the internal combustion engine, the inlet valve device being actuatable or being actuated, in particular being opened and closed, with the valve drive. Since, according to the invention, the operating method which is different than the Miller method is then used during the load step and therefore the inlet valve device is closed later in comparison with the Miller method, the load step can be carried out in a short time, with the result that the above-described driver request can be fulfilled particularly rapidly, in particular after detection of the driver request. Since a switchover is carried out from the operating method to the Miller method after the load step is carried out and therefore after its end, with the result that the inlet valve device is then closed earlier in comparison with the operating method, in particular during the abovementioned, first time interval, the internal combustion engine can be operated with particularly low fuel consumption. Therefore, firstly particularly efficient and therefore low fuel consumption operation of the internal combustion engine can be realized, and secondly a particularly advantageous response behavior of the internal combustion engine can be realized, since only a short time passes between the detection of the driver request and the fulfilling of the driver request and, as a consequence, the end of the load step.

The feature that the first time interval directly or immediately follows the load step or its end is to be understood to mean that a further load step or a deliberate change in the torque does not happen between the load step and the first time interval, the end of the load step coinciding, in particular, with a start of the first time interval.

In order to realize operation of the internal combustion engine which is particularly low in fuel consumption and is therefore particularly advantageous, it is provided in the case of one embodiment of the invention that the inlet valve device is operated in accordance with the Miller method during a time interval which temporally directly or immediately precedes the load step, and is closed earlier as a result in comparison with the operating method. The feature that the second time interval temporally directly or immediately precedes the load step and therefore its beginning is to be understood to mean, in particular, that a further load step or a further change in the torque does not happen between the second time interval and the load step, with the result that, for example, the beginning of the load step coincides with an end of the second time interval. As a result, it is possible for the internal combustion engine to be operated in accordance with the Miller method in particularly large ranges of its engine map, as a result of which the internal combustion engine can be operated with particularly low fuel consumption. If the driver wants a load step, however, with the result that particularly transient or dynamic operation of the internal combustion engine is advantageous, the internal combustion engine is switched over from the Miller method to the operating method in order to carry out the load step, with the result that the load step is carried out on the basis of the operating method. After the load step is carried out, that is to say after its end, the internal combustion engine is switched over again from the operating method to the Miller method, in order to realize particularly efficient operation.

A further embodiment is distinguished by the fact that, between the time interval and the load step being carried out or the beginning of the load step, operation of the inlet valve device in accordance with a further operating method which is different than the Miller method and than the operating method does not happen. As a result, firstly operation of the internal combustion engine with a particularly low fuel consumption can be ensured. Secondly, the load step can be carried out in a short time, with the result that the driver request can be fulfilled particularly quickly.

It is provided in the case of a further particularly advantageous embodiment of the invention that, after the load step is carried out, that is to say after its end, and before the switchover from the operating method to the Miller method, a change in the torque which is brought about deliberately does not happen. Therefore, after the end of the load step and in the case of the switchover and after the switchover from the operating method to the Miller method, the internal combustion engine provides the torque which has the second value and therefore at least substantially constantly via its output shaft, with the result that particularly advantageous drivability can be realized.

It is provided in a further, particularly advantageous refinement of the invention that the internal combustion engine comprises a supercharger device which is arranged in the intake section for compressing the fresh air which is to be fed to the combustion chamber. The supercharger device is, for example, the abovementioned compressor. Particularly efficient operation of the internal combustion engine can be ensured by way of the use of the supercharger device. The supercharger device comprises, for example, a compressor impeller, with which the fresh air can be compressed by way of driving of the compressor impeller. The supercharging device, in particular the compressor, can be a constituent part of an exhaust gas turbocharger which comprises, for example, a turbine with a turbine wheel. The turbine wheel can be driven by exhaust gas of the internal combustion engine, the exhaust gas of which results from the combustion of the mixture. The compressor impeller can be driven by the turbine wheel, in particular via a shaft of the exhaust gas turbocharger, with the result that energy contained in the exhaust gas can be utilized to compress the fresh air.

It has proven here to be particularly advantageous if the internal combustion engine is switched over by way of the load step from naturally aspirated operation, in which a compression, brought about with a device which is arranged in the intake section, of the fresh air which is fed to the combustion chamber does not happen, into supercharged operation, in which the fresh air which is fed to the combustion chamber is compressed with the supercharger device which is arranged in the intake section. It can therefore be provided, for example, that the internal combustion engine is operated during the second time interval in normally aspirated operation and therefore as a normally aspirated engine. In the first time interval which follows the load step, however, and therefore as a consequence of the load step, the internal combustion engine is operated in supercharged operation and therefore as a supercharged internal combustion engine, in particular as a turbo engine. As a result, firstly operation of the internal combustion engine with particularly low fuel consumption can be realized, and secondly a particularly satisfactory response behavior of the internal combustion engine can be ensured. In the case of this embodiment, for example, the load step from normally aspirated operation into supercharged operation therefore takes place by way of the control times which are optimum in terms of boost pressure and/or filling. As soon as the supercharging device has applied or provided a mass of the fresh air which is necessary for the provision of the torque which has the second value, with the result that, for example, the internal combustion engine can then provide the torque which has the second value via its output shaft and, as a consequence, the load step can be concluded, a temporal fade from the further control times into or to the Miller control times takes place for example, in particular directly. This does not necessarily have to be provided, however. The fade might also not be carried out in a linear manner. The temporal fade is therefore to be understood to mean the switchover from the operating method to the Miller method and therefore a switchover from the further control times to the Miller control times. The fade takes place in a torque-neutral manner, with the result that a deliberate change in the torque does not happen. In particular, the switchover from the operating method to the Miller method can be realized by way of corresponding operation of the supercharger device which, for example, provides the fresh air in such a way or compresses it to such an extent that the load step can be carried out and, as a consequence, the torque can be increased from the first idle state to the second idle state, and the internal combustion engine provides or can provide the torque via its output shaft with the Miller method. By way of the method according to the invention, the load step which is also called a load build-up can be carried out just as rapidly as in the case of an internal combustion engine which is operated, for example, exclusively with control times which are optimum in terms of boost pressure and/or filling.

It is preferably provided in the case of a further, alternative embodiment that the internal combustion engine is operated as a supercharged internal combustion engine and, as a consequence, in a or the supercharged operation immediately before the load step, that is to say before its beginning, during the load step and immediately after the load step, that is to say after its ending, in or during which supercharged operation the fresh air which is fed to the combustion chamber within the respective work cycle and, as a consequence, is introduced into the combustion chamber is compressed with the supercharger device. In other words, it is preferably provided that the internal combustion engine is operated in a or the supercharged operation during a first time period which temporally directly precedes the load step and can be, for example, the abovementioned second time interval, during the load step and during a second time period which follows the load step temporally directly or immediately and during which the internal combustion engine provides the torque which has the second value via its output shaft and is switched over from the operating method which is different than the Miller method to the Miller method and, as a result, the inlet valve device is operated in accordance with the Miller method and is closed earlier as a result in comparison with the operating method, it being possible for example for the second time period to be the abovementioned, first time interval, in which supercharged operation the fresh air which is fed to the combustion chamber is compressed with the supercharger device. This means that the load step starts from the supercharged operation or begins in supercharged operation and ends in the case of or in supercharged operation. Once again in other words, for example, the load step begins and ends in a map range, in which the internal combustion engine is operated in supercharged operation. If, for example, the internal combustion engine is operated here during the first time period in accordance with the Miller method (Miller combustion method), fading or fading back in the direction of or to the operating method is carried out very rapidly, with the result that fading back or fading from the Miller control times to the further control times takes place. Since the internal combustion engine is preferably already operated during the first time period in supercharged operation here, a very high intake manifold pressure (also called collector pressure) which acts to greatly increase the filling in combination with rapid opening and/or a large stroke of the inlet valve device and, for example, an increasing inlet valve spread prevails in the intake section during the first time period and therefore in the case of the Miller method, as a result of which the torque which has the second value (also called the setpoint torque) or the second value can be achieved particularly rapidly. When the setpoint torque or the second value of the torque is achieved, preferably torque-neutral fading to the Miller control times takes place, as described above. The Miller method which is used, for example, during the first time period therefore, as it were, preloads the manifold pressure or a boost pressure of the fresh air which is brought about with the supercharger device against the inlet valve device, which can be utilized in dynamics to achieve the setpoint torque particularly rapidly and, as a consequence, to carry out the load step particularly rapidly. The boost pressure is to be understood to mean, in particular, that the fresh air is to be compressed or is compressed to the boost pressure with the supercharger device.

A further embodiment is distinguished by the fact that normally aspirated operation, in which a compression, brought about with a device arranged in the intake section, of the air which is fed to the combustion chamber does not happen, does not happen temporally between the first time period and the load step, in particular its beginning, during the load step and temporally between the load step and the second time period. This means that the internal combustion engine is operated continuously or without interruption as a supercharged internal combustion engine and, as a consequence, in supercharged operation during the first time period, while the load step is carried out, and during the second time period. As a result, a particularly rapid response behavior and operation of the internal combustion engine with particularly low fuel consumption can be realized.

Finally, it has been shown to be particularly advantageous if a boost pressure, brought about by way of the compression of the fresh air brought about with the supercharger device, of the fresh air which is compressed to the boost pressure with the supercharger device is increased during the switchover from the operating method to the Miller method. As a result, a reduction in the torque which results from the switchover from the further control times to the Miller control times can be avoided or compensated for, with the result that firstly the internal combustion engine can provide the torque which has the second value via its output shaft and secondly the internal combustion engine can be operated in accordance with the Miller method and therefore with particularly low fuel consumption.

A second aspect of the invention relates to an internal combustion engine for a motor vehicle, the internal combustion engine being configured to carry out a method in accordance with the first aspect of the invention. Advantages and advantageous refinements of the first aspect of the invention are to be considered to be advantages and advantageous refinements of the second aspect of the invention, and vice versa.

BRIEF DESCRIPTION OF THE DRAWINGS

Further details of the invention result from the following description of one exemplary embodiment with the associated drawings, in which.

DETAILED DESCRIPTION OF THE DRAWINGS

Figure 1:
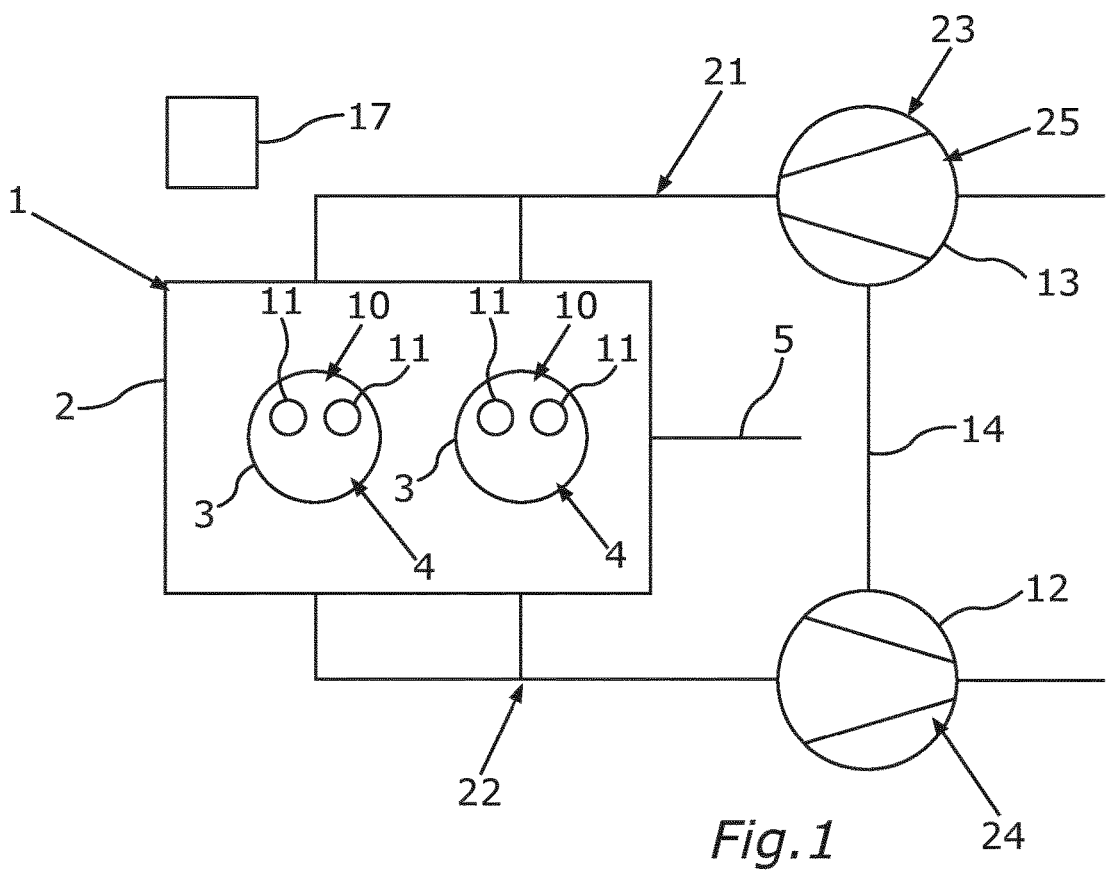
FIG. 1 shows a diagrammatic illustration of an internal combustion engine according to the invention for a motor vehicle, the internal combustion engine being configured to carry out a method according to the invention.

FIG. 1 shows a diagrammatic illustration of an internal combustion engine 1 of a motor vehicle, in particular a motor car which is preferably configured as a passenger car. This means that the motor vehicle comprises the internal combustion engine 1 and can be driven with the internal combustion engine 1. For example, the motor vehicle is configured as a hybrid vehicle. The internal combustion engine 1 has a housing element 2 which is configured, for example, as a cylinder housing, in particular as a cylinder crankcase, and which forms or delimits the cylinder 3 of the internal combustion engine 1. A respective piston (which cannot be seen in greater detail in the figures) is received in the respective cylinder 3 such that it can move in a translational manner. The respective piston can move relative to the housing element 2 in a translational manner between a top dead center (OT) and a bottom dead center (UT). The respective cylinder 3 and the respective piston which is arranged in the respective cylinder 3 form or delimit in each case partially a respective combustion chamber 4 of the internal combustion engine 1. Moreover, the internal combustion engine 1 has an output shaft 5 which is preferably configured as a crankshaft. The respective piston is connected, for example, via a respective connecting rod in an articulated manner to the crankshaft (output shaft 5), with the result that the translational movements of the respective piston can be converted into a rotational movement of the crankshaft. Therefore, the crankshaft can be rotated about a rotational axis relative to the housing element 2. Via the output shaft 5, the internal combustion engine 1 can provide a torque for driving the motor vehicle. The torque is a or the load of the internal combustion engine 1. In other words, the torque is usually opposed by a load of the internal combustion engine, the torque overcoming the load or corresponding to the load. Therefore, the torque is also called the load of the internal combustion engine 1. In other words, the torque which is provided by the internal combustion engine 1 via its output shaft 5 can be utilized as a measure of a or the load of the internal combustion engine 1.

During combustion operation of the internal combustion engine 1, combustion processes take place in the combustion chambers 4, as a result of which the piston and, via it, the crankshaft are driven. As a result, the crankshaft rotates about the rotational axis at a rotational speed relative to the housing element 2. The rotational speed of the crankshaft is also called the rotational speed of the internal combustion engine 1.

The respective combustion chamber 4 is assigned (in particular, precisely) one inlet valve device 10. The respective inlet valve device 10 comprises precisely two inlet valves 11, it being possible for the inlet valve 11 to be moved, in particular in a translational manner and/or relative to the housing element 2, between a respective closed position and at least one respective open position. The internal combustion engine 1 is a four stroke engine, with the result that a respective work cycle of the internal combustion engine 1 has precisely four strokes. Here, the respective work cycle comprises precisely two complete revolutions of the crankshaft and, as a consequence, 720 degrees of crank angle. Within the respective work cycle, the respective inlet valves 11 of the respective inlet valve device 10 and therefore the inlet valve device 10 are opened in the case of a first rotational position (also called an open rotational position) of the crankshaft and are closed in the case of a second rotational position (also called a closed rotational position) of the crankshaft. The open rotational position coincides with a first time, at which the respective inlet valve device is opened within the respective work cycle, and the closed rotational position coincides within the respective work cycle with a second time, at which the respective inlet valve device 10 is closed and, as a result, reaches or assumes its closed position. Once again in other words, the opening of the initially closed inlet valve device 10 begins at the first time, and the opening ends at the second time within the respective work cycle. Here, for example, the inlet valve device 10 is open, in particular continuously, during a time interval which extends, in particular continuously, from the first time to the second time. The open rotational position is also called Inlet Opens (EÖ), the closed rotational position also being called Inlet Closes (ES). On its path from the closed position into the open position, the respective inlet valve 11 covers what is known as a stroke which is also called an inlet stroke.

In particular, the internal combustion engine 1 comprises a variable, in particular fully variable, valve drive, with which the respective inlet valve 11 and therefore the respective inlet valve device 10 can be actuated, that is to say can be opened or closed or is opened and closed within the respective work cycle. The variable valve drive is variable, in particular, in so far as different valve lift curves can be set, in accordance with which the respective inlet valve 11 can be or is actuated within the respective work cycle and, as a consequence, can be or is opened and closed. Here, the valve lift curves can be set selectively. For example, the different valve lift curves differ in terms of their strokes of the respective inlet valve 11 and/or in terms of the Inlet Closes. For example, the valve lift curves have the same Inlet Opens.

Moreover, the internal combustion engine 1 has an intake section 21 which is also called an inlet section and through which fresh air can flow or flows. Via the respective inlet valve device 10, the fresh air can be introduced from the intake section 21 into the respective combustion chamber 4 and, as a consequence, can be fed to the respective combustion chamber 4 within the respective work cycle and, in particular, as long as or when the inlet valve device 10 is open.

The respective combustion chamber 4 is also assigned in each case (in particular, precisely) one outlet valve device which is not shown in greater detail in the figures. The respective outlet valve device comprises, for example, at least or precisely two outlet valves, it being possible for the respective outlet valve to be moved, or being moved, between a respective, second closed position and at least or precisely one respective, second open position, in particular within the respective work cycle. What is known as Outlet Closes of the respective outlet valve is also denoted by AS. The Outlet Closes AS is a rotational position of the crankshaft, the respective outlet valve or the respective outlet valve device being closed at the Outlet Closes and, as a consequence, reaching or assuming the second closed position. At the Outlet Opens, the opening of the respective, initially closed inlet valve 11 and therefore the initially closed inlet valve device 10 begins, the respective inlet valve 11 being opened within the context of this opening and therefore being moved out of the first closed position into the first open position and back again into the first closed position. The opening ends at the Inlet Closes, with the result that the respective inlet valve 11 or the respective inlet valve device 10 assumes or reaches the first closed position at the Inlet Closes.

In the following text, a method for operating the internal combustion engine 1 will be described. In the case of the method, the internal combustion engine 1 is operated, in particular is open-loop or closed-loop controlled, in combustion operation, in particular with an electronic computing device 17 which is also called an engine controller or engine control unit. In the case of the method, a load step of the internal combustion engine is carried out, in particular with the electronic computing device 17, the torque which is provided by the internal combustion engine via its output shaft 5 being increased in the case of the load step from a first value to a second value which is higher than the first value.

In order for it then to be possible firstly for the load step to be carried out and therefore completed in a particularly short time and secondly for operation of the internal combustion engine 1 with particularly low fuel consumption to be realized, it is provided in the case of the method that, while the load step is carried out, the respective inlet valve device 10 is operated in accordance with an operating method which is different than the Miller method and, as a result, is closed later within the respective work cycle in comparison with the Miller method. After the load step is carried out and therefore after its end and while the internal combustion engine 1 provides the torque which has the second value via its output shaft 5, the internal combustion engine 1 is switched over, in particular with the electronic computing device 17, from the operating method which is different than the Miller method to the Miller method, as a result of which the respective inlet valve device 10 is operated in accordance with the Miller method after the load step is carried out and while the internal combustion engine 1 provides the torque which has the second value via its output shaft 5, and is closed earlier in comparison with the operating method as a result. This means that the Inlet Closes is advanced by way of the switchover of the internal combustion engine 1 from the operating method to the Miller method. After and as a result of the switchover of the internal combustion engine 1 from the operating method to the Miller method, the respective inlet valve device 10 is actuated, in particular is opened and closed, on the basis of or in accordance with what are known as Miller control times. If the respective inlet valve device 10 is operated and therefore actuated in accordance with the operating method, the respective inlet valve device 10 is operated within the respective work cycle in accordance with further control times which are different than the Miller control times and, for example, are optimum in terms of boost pressure and/or filling, with the result that the load step can be carried out and, in particular, completed in a particularly short time. The Miller control times differ from the further control times at least or exclusively by virtue of the fact that the Inlet Closes is earlier within the respective work cycle. For example, the Miller control times provide that the Inlet Closes lies ahead of the bottom dead center of the respective piston. The operating method or its further control times provides/ provide, for example, that the Inlet Closes coincides with the bottom dead center or else preferably lies after the bottom dead center of the piston, in particular within the respective work cycle.

Figure 2:
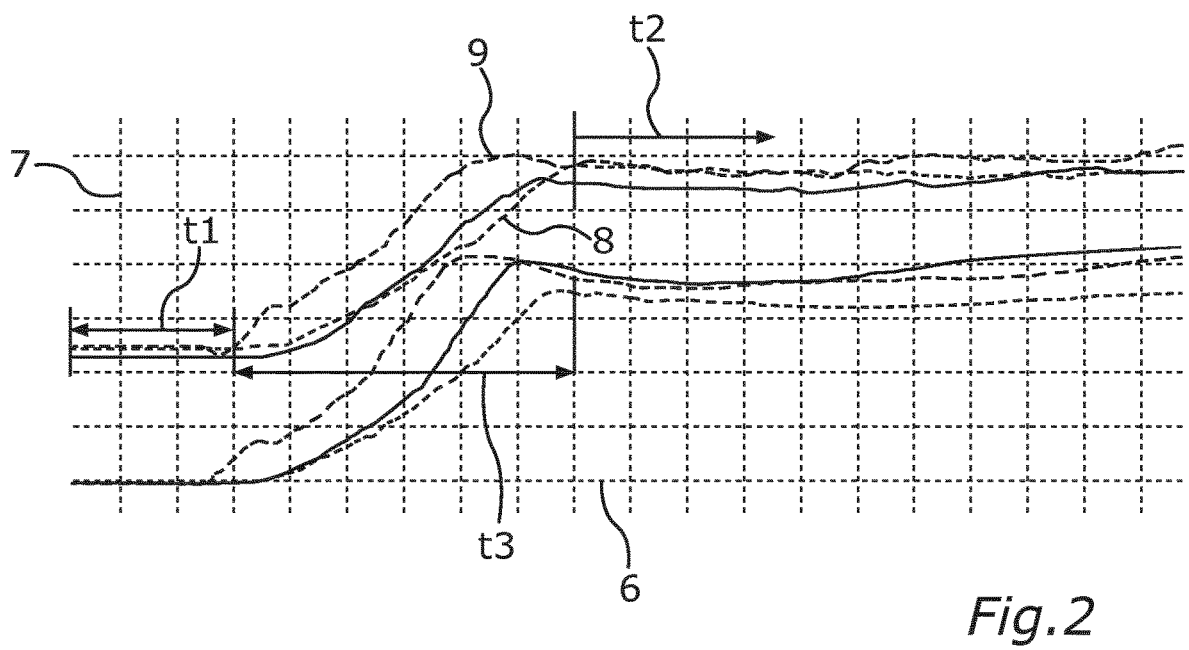
FIG. 2 shows a diagram to illustrate the method.

FIG. 2 shows a diagram, on the abscissa 6 of which the time is plotted. The torque or the load, for example, is plotted on the ordinate 7 of the diagram. In other words, values of the torque or the load are plotted on the ordinate 7. A profile 8 is therefore a temporal profile of the torque; the profile 8 would occur, for example, if the internal combustion engine 1 is operated or were operated in accordance with the Miller method both immediately before the load step and during the load step and also immediately after the load step. Moreover, a profile 9 which is a second temporal profile of the torque is plotted in the diagram which is shown in FIG. 2. The profile 9 is produced by way of the described method, in the case of which the internal combustion engine 1 or the inlet valve device 10 is operated in accordance with the operating method during the load step, it preferably being provided that the internal combustion engine 1 or the respective inlet valve device 10 is operated in accordance with the Miller method immediately before the load step and immediately after the load step. Therefore, in order to carry out the load step, the internal combustion engine 1 is switched over from the Miller method to the operating method, in particular with the electronic computing device 17, with the result that the internal combustion engine 1 is operated in accordance with the operating method during the load step. After the load step is carried out, that is to say after its end, the internal combustion engine 1 is switched over again from the operating method to the Miller method, in particular with the electronic computing device 17, with the result that the internal combustion engine 1 is operated in accordance with the Miller method immediately before and immediately after the load step, and is operated in accordance with the operating method during the load step. The profile 8 therefore illustrates a first case, in which the internal combustion engine is operated both immediately before and immediately after the load step, and also during the load step, in accordance with the Miller method. By contrast, the profile 9 illustrates a second case, in which the internal combustion engine 1 is operated immediately before and immediately after the load step in accordance with the Miller method, but is operated in accordance with the operating method during the load step. It can be seen on the basis of a comparison of the profiles 8 and 9 that, in both cases, the internal combustion engine 1 provides the torque which has the second value and is also called a setpoint torque when it has the second value via its output shaft 5, but the load step can be carried out in the second case substantially more rapidly or in a shorter time than in the first case, with the result that the internal combustion engine 1 provides the setpoint torque via its output shaft 5 substantially earlier in the second case than in the first case, in particular as considered or calculated from a start time, at which it is detected that the driver of the motor vehicle requests, that is to say wants, the load step, that is to say the beginning thereof.

In FIG. 2, a first time period which precedes the load step temporally immediately and therefore directly is denoted by t1, and a second time period which follows the load step and therefore its end immediately and therefore directly is denoted in FIG. 2 by t2. The load step per se takes place during a third time period t3, or lasts for the time period t3 which lies between the time periods t1 and t2, begins with the end of the first time period t1 and ends with the beginning of the second time period t2. It is preferably provided that the internal combustion engine 1 is operated in accordance with the Miller method during the time periods t1 and t2, in particular in an interruption-free manner. During the time period t3, however, the internal combustion engine 1 is preferably operated, in particular without interruption, in accordance with the operating method which is different than the Miller method.

It is conceivable that the internal combustion engine 1 is operated in normally aspirated operation during the time period t1 and is operated in supercharged operation during the time period t2 and therefore as a consequence of the load step being carried out. A compression of the fresh air which is fed to the respective intake section 21 of combustion chamber 4 does not happen in normally aspirated operation. In supercharged operation, however, the fresh air which is fed to the respective combustion chamber 4 or the combustion chambers 4 is compressed with a supercharger device which is arranged in the intake section 21.

In combustion operation, the abovementioned fresh air is introduced into the combustion chambers 4 via the inlet valve devices 10 within the respective work cycle. Moreover, a fuel which is, in particular, liquid is introduced, in particular injected, into the respective combustion chamber 4 in combustion operation within the respective work cycle. The fuel is preferably a gasoline, with the result that the internal combustion engine 1 is preferably configured as a gasoline engine. By virtue of the fact that the fresh air is guided into the respective combustion chamber 4 within the respective work cycle and the fuel is introduced, a respective fuel/air mixture (also called a mixture) is formed within the respective work cycle, which fuel/air mixture comprises the fuel and the fresh air. Within the respective work cycle, the mixture is ignited, in particular by way of spark ignition, and is burned as a result in combustion operation of the internal combustion engine 1. Exhaust gas of the internal combustion engine 1 occurs as a result. Here, the internal combustion engine 1 has an exhaust gas section 22 which can be flowed through by the exhaust gas from the respective combustion chamber 4 and with which the exhaust gas is discharged from the combustion chambers 4. Here, within the respective work cycle, the exhaust gas from the respective combustion chamber 4 can be guided into the exhaust gas section 22 via the respective outlet valve device which, in particular, is then open. Here, the internal combustion engine 1 comprises an exhaust gas turbocharger 23 which has a turbine 24 which is arranged in the exhaust gas section 22 and has a turbine wheel 12. The turbine wheel 12 can be driven by the exhaust gas which flows through the exhaust gas section 22. The compressor 25 comprises a compressor impeller 13, with which the fresh air which flows through the exhaust gas section 22 can be compressed by way of driving of the compressor impeller 13. Here, the compressor impeller 13 can be driven by the turbine wheel 12, in particular via a shaft 14 of the exhaust gas turbocharger 23.

In the case of the exemplary embodiment which is shown in FIG. 1, the compressor 25 is the abovementioned supercharger device, with which the fresh air is compressed in supercharged operation. In normally aspirated operation, a compression of the fresh air brought about by way of the supercharger device does not happen, and a compression of the fresh air brought about by way of a device which is arranged in the intake section 21 generally does not happen in normally aspirated operation, with the result that the internal combustion engine 1 is preferably operated in normally aspirated operation as a (in particular, pure) normally aspirated engine. It is therefore conceivable that the internal combustion engine 1 is transferred or switched over from normally aspirated operation into supercharged operation by way of the load step.

As an alternative, it is conceivable that the internal combustion engine is operated in supercharged operation both immediately before and immediately after the load step and during the load step. In other words, it is conceivable that the internal combustion engine 1 is operated in supercharged operation and is therefore operated as a supercharged internal combustion engine and, as a consequence, as a turbo engine both during the first time period t1 and during the second time period t2 and during the third time period t3, preferably in each case without interruption. As a result of the switchover (also called fading or fading back) of the internal combustion engine 1, in particular initially from the Miller method to the operating method and then from the operating method to the Miller method, operation of the internal combustion engine 1 with particularly low fuel consumption can be realized. Moreover, a particularly satisfactory response behavior of the internal combustion engine 1 can be realized, since carrying out of the load step can be kept particularly short, that is to say can take place in a short time.

Figure 3:
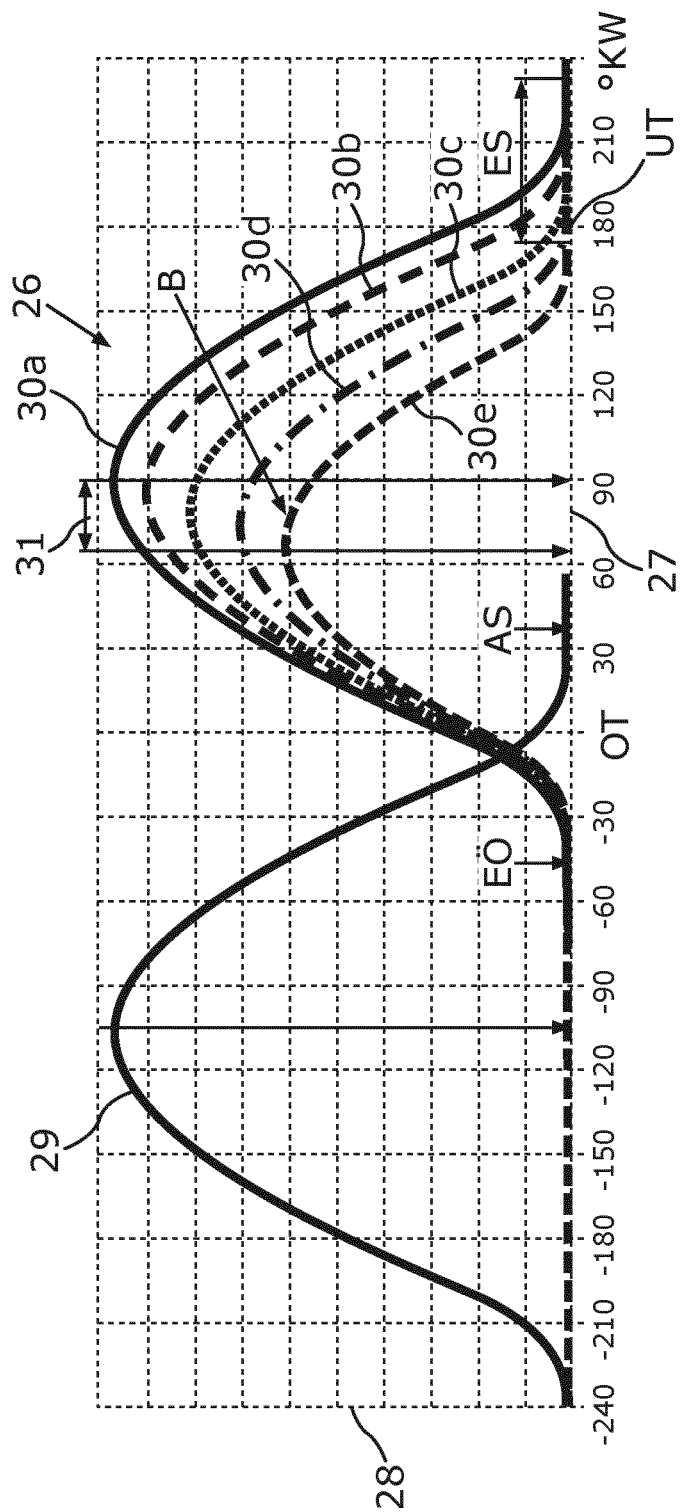
FIG. 3 shows a further diagram to further illustrate the internal combustion engine and the method.

FIG. 3 shows a diagram 26, on the abscissa 27 of which degrees of crank angle (° KW) are plotted. Moreover, the diagram 26 has an ordinate 28, on which the stroke is plotted. Here, FIG. 3 shows a plurality of valve lift curves 30*a-e*, in accordance with which the respective inlet valve 11 is moved or can be moved within the respective work cycle out of its closed position into its open position and back again into the closed position. In particular, the internal combustion engine 1 comprises a variable valve drive, with which the respective inlet valve 11 can be actuated, that is to say can be opened and closed. The variable valve drive is variable, in particular, in so far as the different valve lift curves 30*a-e*, in accordance with which the respective inlet valve 11 is or can be actuated and, as a consequence, is or can be opened or closed within the respective work cycle, can be set or are set selectively. It can be seen from FIG. 3, in particular, that the valve lift curves 30*a-e* differ from one another with regard to the stroke of the respective inlet valve 11, the respective stroke of the inlet valve 11 being the respective maximum of the respective valve lift curve 30*a-e*. Moreover, the valve lift curves 30*a-e* differ from one another in that the respective maximum and, as a consequence, the open position of the respective inlet valve 11 occurs or takes place at different rotary positions which lie in a range denoted by B in FIG. 3. As can be seen from FIG. 3, furthermore, the different valve lift curves 30*a-e* have the same Inlet Opens (EÖ).

Moreover, FIG. 3 shows a further valve lift curve 29, in accordance with which the respective outlet valve is actuated and, as a consequence, is opened and closed within the respective work cycle. AS denotes the Outlet Closes in FIG. 3. The Outlet Closes AS is a rotary position of the crankshaft, the respective outlet valve or the outlet valve device being closed toward or at the Outlet Closes AS and, as a consequence, reaching or assuming the second closed position. At the Inlet Opens EÖ, opening of the respective, initially closed inlet valve 11 and therefore of the initially closed inlet valve device 10 begins, the respective inlet valve 11 being opened within the context of the opening and therefore being moved out of the first closed position into the first open position and back again into the first closed position. The opening of the inlet valve 11 ends at the Inlet Closes ES, with the result that the respective inlet valve 11 or the respective inlet valve device 10 assumes or reaches the first closed position at the Inlet Closes ES.

For example, in the operating method or in the case of the operating method, the respective inlet valve device 10 is actuated in accordance with one of the valve lift curves 30*a-c*, with the result that the operating method provides or comprises that the Inlet Closes ES lies after the bottom dead center UT. In the Miller method or in the case of the Miller method, however, the respective inlet valve device 10 or the respective inlet valve 11 is actuated, for example, in accordance with one of the valve lift curves 30*d-e*, with the result that the Miller method comprises or provides that the Inlet Closes ES lies earlier than in the case of the operating method and, in particular, ahead of the bottom dead center UT. It can be seen from FIG. 3 that the operating method and the Miller method can have the same Inlet Opens EÖ, with the result that the operating method and the Miller method differ from one another at least in that the Inlet Closes ES takes place earlier in the case of the Miller method than in the case of the operating method. In the present case, it is a further difference between the Miller method and the operating method that the stroke (also called inlet stroke or inlet valve stroke) of the respective inlet valve 11 is smaller in the case of the Miller method than in the case of the operating method. A double arrow which is denoted by 31 in FIG. 3 illustrates what is known as an inlet spread which is distinguished by the fact that the open position or the maximum of the respective valve lift curve 30*a-e* takes place at different rotary positions.

LIST OF DESIGNATIONS

1 Internal combustion engine
2 Housing element
3 Cylinder
4 Combustion chamber
5 Output shaft
6 Abscissa
7 Ordinate
8 Profile
9 Profile
10 Inlet valve device
11 Inlet valve
12 Turbine wheel
13 Compressor impeller
14 Shaft
17 Electronic computing device
21 Intake section
22 Exhaust gas section
23 Exhaust gas turbocharger
24 Turbine
25 Compressor
26 Diagram
27 Abscissa
28 Ordinate
29 Valve lift curve
30a-e Valve lift curve
31 Double arrow
AS Outlet Closes
EÖ Inlet Opens
ES Inlet Closes
B Region
t1, t2, t3 Time period

The invention claimed is:

1. A method for operating an internal combustion engine which has at least one combustion chamber for combustion operation of the internal combustion engine, the internal combustion engine having an inlet valve which is assigned to the combustion chamber allowing a flow of fresh air from an intake section of the internal combustion engine into the combustion chamber, wherein a load step where a torque provided by the internal combustion engine via an output shaft of the internal combustion engine is increased from a first value to a second value, the second value being higher than the first value, the method comprising:
while the load step is carried out, operating the inlet valve in accordance with a first operating mode which is different than a second operating mode such that the inlet valve is closed after a bottom dead center of a piston of the combustion chamber and is opened for a longer duration in comparison with the second operating mode, and wherein
after the load step is carried out and while the internal combustion engine provides the torque which has the second value via the output shaft, switching from the first operating mode to the second operating mode such that the inlet valve is closed ahead of the bottom dead center of the piston so that the inlet valve is closed for a shorter duration as a result in comparison with the first operating mode.

2. The method according to claim 1, wherein the inlet valve is operated in accordance with the second operating mode during a time interval which temporally directly precedes the load step, and is closed earlier as a result in comparison with the first operating mode.

3. The method according to claim 2, wherein, between the time interval and the load step being carried out, operation of the inlet valve in accordance with a third operating mode which is different than the second operating mode and than the first operating mode is absent.

4. The method according to claim 1, wherein, after the load step is carried out and before a switchover from the first operating mode to the second operating mode, a change in the torque which is brought about is deliberately absent.

5. The method according to claim 1, wherein the internal combustion engine comprises a supercharger device which is arranged in the intake section for compressing the fresh air which is to be fed to the combustion chamber.

6. The method according to claim 5, wherein the internal combustion engine is switched over by way of the load step from naturally aspirated operation, in which a compression, brought about with the supercharger device which is arranged in the intake section, of the fresh air which is fed to the combustion chamber is absent, into supercharged operation, in which the fresh air which is fed to the combustion chamber is compressed with the supercharger device.

7. The method according to claim 5, wherein during a first time period which temporally directly precedes the load step, during the load step, and during a second time period which temporally directly follows the load step and during which the internal combustion engine provides the torque which has the second value via the output shaft and is switched over from the first operating mode to the second operating mode, the internal combustion engine is operated in supercharged operation, in which the fresh air which is fed to the combustion chamber is compressed with the supercharging device.

8. The method according to claim 7, wherein a normally aspirated operation is absent temporally between the first time period and the load step, during the load step, and temporally between the load step and the second time period.

9. The method according to claim 5, wherein a boost pressure of the fresh air which is brought about by way of the compression of the fresh air via the supercharging device is increased during a switchover from the first operating mode to the second operating mode.

10. An internal combustion engine for a motor vehicle, the internal combustion engine being configured to carry out the method according to claim 1.

11. The method according to claim 1, wherein an opening time of the inlet valve is the same in the first operating mode and the second operating mode.

12. The method according to claim 1, comprising:
operating the inlet valve in accordance with the first operating mode which is different than the second operating mode such that an inlet valve stroke of the inlet valve is larger in comparison with the second operating mode.

13. An internal combustion engine, comprising:
at least one combustion chamber for combustion operation of the internal combustion engine; and
an inlet valve which is assigned to the combustion chamber allowing a flow of fresh air from an intake section of the internal combustion engine into the combustion chamber, wherein during a load step, a torque provided by the internal combustion engine via an output shaft of the internal combustion engine is increased from a first value to a second value, the second value being higher than the first value, wherein while the load step is carried out, the inlet valve is operated in accordance with a first operating mode which is different than a second operating mode such that the inlet valve is closed after a bottom dead center of a piston of the combustion chamber and is opened for a longer duration in comparison with the second operating mode, and wherein after the load step is carried out and while the internal combustion engine provides the torque which has the second value via the output shaft, the inlet valve is switched from the first operating mode to the second operating mode such that the inlet valve is closed ahead of the bottom dead center of the piston so that the inlet valve is closed for a shorter duration as a result in comparison with the first operating mode.

14. The internal combustion engine of claim 13, wherein the inlet valve is operated in accordance with the second operating mode during a time interval which temporally directly precedes the load step, and is closed earlier as a result in comparison with the first operating mode.

15. The internal combustion engine of claim 13, wherein, after the load step is carried out and before a switchover from the first operating mode to the second operating mode, a change in the torque which is brought about is deliberately absent.

16. The internal combustion engine of claim 13, wherein the internal combustion engine is switched over by way of the load step from naturally aspirated operation for compressing the fresh air which is to be fed to the combustion chamber, in which a compression, brought about with a supercharger device which is arranged in the intake section, of the fresh air which is fed to the combustion chamber is absent, into supercharged operation, in which the fresh air which is fed to the combustion chamber is compressed with the supercharger device.

17. The internal combustion engine of claim 13, wherein the internal combustion engine comprises a supercharger device which is arranged in the intake section for compressing the fresh air which is to be fed to the combustion chamber, and wherein during a first time period which temporally directly precedes the load step, during the load step, and during a second time period which temporally directly follows the load step and during which the internal combustion engine provides the torque which has the second value via the output shaft and is switched over from the first operating mode to the second operating mode, the internal combustion engine is operated in supercharged operation, in which the fresh air which is fed to the combustion chamber is compressed with the supercharging device.

18. The internal combustion engine of claim 17, wherein a normally aspirated operation is absent temporally between the first time period and the load step, during the load step, and temporally between the load step and the second time period.

19. The internal combustion engine of claim 17, wherein a boost pressure of the fresh air which is brought about by way of the compression of the fresh air via the supercharging device is increased during a switchover from the first operating mode to the second operating mode.

* * * * *